United States Patent [19]
Halik et al.

[11] 3,943,266
[45] Mar. 9, 1976

[54] DRIED TOFU POWDER

[75] Inventors: Joseph John Halik, Ossining; Esra Pitchon, Flushing; Marvin Schulman, Monroe, all of N.Y.; Milton H. Schwarz, Westport; Milton Yezek, Stanford, both of Conn.

[73] Assignee: General Foods Corporation, White Plains, N.Y.

[22] Filed: Apr. 10, 1974

[21] Appl. No.: 459,769

[52] U.S. Cl. ............ 426/656; 426/431; 426/471; 426/481; 426/489; 426/507
[51] Int. Cl.² ........................................ A23J 1/14
[58] Field of Search ........... 426/148, 364, 373, 431, 426/456, 471, 489, 656, 481, 507

[56] References Cited

UNITED STATES PATENTS

| | | | |
|---|---|---|---|
| 2,785,155 | 3/1957 | Anson et al. | 426/431 X |
| 3,399,997 | 9/1968 | Okumura et al. | 426/431 X |
| 3,723,407 | 3/1973 | Miller et al. | 426/364 |
| 3,794,735 | 2/1974 | Newsom et al. | 426/431 X |

Primary Examiner—A. Louis Monacell
Assistant Examiner—R. A. Yoncoskie
Attorney, Agent, or Firm—Bruno P. Struzzi; Thomas V. Sullivan; Michael J. Quillinan

[57] ABSTRACT

A soy milk is precipitated and the resulting whey is centrifugally separated from the curd and washed, whereupon the curd is colloidally dispersed and spray dried.

9 Claims, No Drawings

DRIED TOFU POWDER

BACKGROUND OF THE INVENTION

The production of a vegetable milk by extraction from a slurry of ground soy bean meal has been practiced heretofore. Essentially the soy bean milk is precipitated as a curd and a whey; the curd has a number of desired functional and nutritional values. However, impeding exploitation of these values have been limitations or problems associated with the instability of the product.

An object of the invention is to provide a dried form of soy curd having a better nutritional value than more conventional soy protein derivatives derived from soy bean meal but which at the same time has less of a "grainy" or nutty beany flavor and less of the flatulent sugars which so characterize many soy bean preparations. Desirably this protein preparation should represent competitive usable protein value in relation to other sources of protein supplementation such as milk solids, beef by-products, egg white and cheese powders.

Of paramount importance to this art is the provision of a curd preparation having flavor and odor characteristics which do not require masking by other flavors; in view of rising dairy costs and costs of other protein supplements both domestically and abroad a definite need exists for such an economical and highly nutritious product that can be substituted freely for other fortifying adjuncts in foodstuffs. The accompanying description of preferred embodiments of this product should be derived by a process wherein the soy bean per se is the starting material rather than soy bean meal or flakes that have been defatted by oil extraction through solvent extraction. The product recovery should be in a stable usable form without substantial denaturation.

SUMMARY OF THE INVENTION

The present process employs a sequence of processing conditions whereby a substantially functional and flavorfully stable protein preparation is recoverable from ingredients that heretofore have been associated in soy bean milk; the invention recovers from the milk a curd that is substantially reduced in whey solids and constituents associated with the whey phase of the milk by centrifugation and washing; it is found the curd is thereby depleted of many of the constituents which have been responsible for undesirable flavor characteristics. In accordance with the invention whey and associated water soluble components are centrifugally skimmed from a relatively cohesive curd generated under high gravity forces as in a solid bowl basket centrifuge; thereafter the bean curd is centrifugally "finished" by employment of a plurality of washes.

The finished washed bean curd is then subdivided by passage with added water through a mill and converted to a pumpable slurry. This slurry is ultimately subjected to spray drying using inlet air temperatures below 500°F whereat droplets that are caused to be sprayed into a heated air chamber undergo rapid evaporation without any further substantial denaturation of the soy bean protein. It is believed that a significant proportion of the functionalities to be hereinafter described are attributable to avoiding denaturation by dehydrating the washed and substantially whey-free curd particles and relatively low temperature exposures and short processing times.

DETAILED DESCRIPTION OF THE INVENTION

The invention is particularly critical in the sense that it calls for the treatment of soy bean curd under conditions which avoid freezing of the curd since it has been found that freezing preparatory to further dehydration, e.g. freeze drying, does not result in the intended functionalities.

The soy milk and precipitated curd processed by the preferred embodiments of this invention can be recovered by customary methods which involve water immersion of the soy bean and the grinding, heating, decantation or filtration and precipitating of the curd and whey; although ground soy beans may be employed, it is preferred but not critical that one employ whole soy beans either of which materials will be steeped overnight preparatory to being exposed to hot water and/or steam to produce a primary extract.

The major departure of the present invention involves adoption of centrifuging techniques relatively conventional in other arts in lieu of pressing techniques that have heretofore been traditionally employed to separate curd in a usable form from the salt-precipitated extract. By employing a high gravity centrifuging vessel (exceeding 500 g's) developing a two phase curd and whey system in the vessel, the practical ability to skim and wash under centrifugation has resulted in depletion of those constituents which detract from organoleptic acceptability of the spray dried curd particles.

Centrifugal separation of curd and whey permits recovery of in excess of 45 percent of the total bean solids, 65 percent of bean protein content and 50 percent of the bean oil. Products of the present process have a high yield point in terms of their gelation characteristic and have a high work factor in terms of the grams per cc used to measure gelation functionality.

Protein content of the recovered dried powderous curd has been analyzed as high as 50 percent with an oil content at 29 percent. Spray dried curd powders have been stored for as long as 11½ weeks at 100°F. in air packs and when recovered were found to be bland and superior in flavor to defatted soy flours concentrates and isolates of commerce. Moreover, product aroma when evaluated both dry and wet was judged to be low in those beany cooked cereal notes which have been objected to and limited the full utilization of soy protein preparations. The powderous dried bean curd is a bland, floury, only slightly "beany" composition having a "low" flavor characteristic which renders the product blendable as an adjunct to a variety of food products such as hamburger extenders. The protein efficiency of the preparation exceeds 2.0 and is approximately 2.3 based on methionine, cystine analysis.

A typical analytical assay of the product of this invention is:

| | |
|---|---|
| Protein | 49.2% |
| Oil | 20.8% |
| Water | 2.4% |
| Carbohydrate | 7.0% |
| Raffinose | 0.57% |
| Stachyose | 4.3% |
| Sucrose | 2.7% |
| Ash | 7.44% |
| Calcium | 1.49% |
| Iron | 124 ppm |

-continued

| | |
|---|---|
| Lipoxydase | Non-detectable |

A specimen produced having the foregoing assay had the following laboratory-determined amino acid value:

| | |
|---|---|
| Methionine | 8.67 mg./gm. |
| Cystine | 9.3 mg./gm. |

Perhaps the most remarkable characteristic is the storage stability of the spray dried powders; low peroxide values on oil extracted from spray dried powders indicate good oil stability for samples that have been stored for in excess of 11 weeks and were air packed at 100°F.; taste and aroma valuations by trained profile panel were unable to detect a flavor change between the initial sample and a comparable sample stored over 11½ week period.

The centrifugally separated and washed dried bean curd has applications in both the beverage and non-beverage areas and will find particularly advantageous uses in the food arts where cereal or beverage fortification is a paramount consideration.

The dried curd can be produced from soy bean milk precipitated by the addition of calcium sulphate or calcium chloride which co-precipitates protein and oil. Preparatory to making the precipitate, the soy beans are preferably washed and soaked overnight and ground under conditions which employ stainless steel both in the grinding and elsewhere, although in some applications a stone mill with continuous water addition in small quantities may also be employed to produce a mash which is eventually subjected to a primary extraction preparatory to precipitation; this mash is cooled and the milk is heated for sufficiently long periods of time at elevated temperatures in order to inactivate the lipoxydase enzyme activity. Upon separation of the primary extract, the mash is preferably subjected to a secondary extraction in order to maximally recover those usable bean curd proteins to be converted into the powderous form of the present composition. The protein content is substantially undenatured as extracted and is capable of forming a soft gel by itself. In general, the soy bean milk will be extracted over a period of at least 5, in excess of 15 but not exceeding 120 minutes in order to achieve the degree of extraction which results in the preferred separable curd generated by precipitation. In recovering the soy milk as both a primary and secondary extraction, it is desired, though not essential, that the extraction be carried out, under elevated temperatures (250°–170°F.), generally above 190°F. usually for a period not exceeding 90 minutes, whereby an extract capable of forming a soft gelatinous precipitate may be provided upon salt addition; this contributes to forming a gelatinous condition which permits effective centrifugal curd and whey phase development, and skimming washing. To some degree the type of salt, be it calcium sulphate or a mixture of calcium chloride and magnesium chloride, is consequential; in some applications it may be desirable to employ calcium chloride and magnesium chloride to prepare a particularly hard curd texture. Calcium sulphate is the preferred precipitating salt.

OPERATIVE EXAMPLE

One hundred pounds of Lee beans and 800 pounds of water are soaked for 15 hours in water at 35°F. or until the beans are substantially hydrated; the soak and all subsequent processing is carried out in stainless steel equipment. Hydrated beans are then drained of free water and reintroduced to 700 pounds of water at 200° F. and fed to a Fitzpatrick hammer mill, the beans being submerged throughout milling, and grinding being continued for 10 minutes, the beans passing a screen whose openings are approximately ½ inch square.

The ground bean charge is then introduced to an autoclaving vessel and maintained therein for 30 minutes at 212° F. or for a period to substantially inactivate lipoxidase enzyme content thereof; during this autoclaving major bean constituents of protein and carbohydrate are extracted together with fat as a soy milk. The soy milk is then continuously separated from the unextracted bean solids in a Sharples decanter. The residue is recovered from the decanter in a semi-dried state for a second autoclaving together with an additional 150 pounds of water at 225° F. for 35 minutes, the resulting residue and secondary milk of the slurry being thereafter separated in the same manner as followed for primary extraction in the decanter aforesaid; the residue from the secondary extraction will desirably be recovered and separately dried for use as feed or protein supplement.

The secondary and primary milks are then combined and heated to 160° F. in a tank. 775 pounds of the composite soy milk containing 60 pounds of solids including fat is then caused to undergo precipitation by a suspension of 4 pounds of calcium sulphate in 50 pounds of water which is added to the precipitating tank. Precipitation in the tank is continued at a 160° F. for 30 minutes until a firm curd has been obtained. During precipitation, tank contents are gradually stirred manually with a gentle stirring action and residual curd is washed from tank walls by a wash of 35 pounds rinse water.

The precipitated curd and whey are then subjected to separation in a 24 inch diameter Tolhurst centrifuge continuously operating at 1400 RPM equipped with a solid wall basket and adjustable skimmer tube to separate the whey and curd. The centrifuge is operated with a load, spin and wash cycle sequence as follows: 1/6 part of the precipitate is charged to batch load the centrifuge during the loading cycle; during centrifugation curd collects on the inner face of the solid basket wall; loading may be interrupted to facilitate even development of the curd bed; loading is continued until 2 inch bed of curd is accumulated circumjacent which will collect a fluid whey phase. The port of the skimmer tube is then adjusted to be proximate the interface between the whey and the curd without disturbing the bed thereof, whereby whey can thereafter be skimmed from the centrifuge with minimal curd loss. The load cycle occurs over approximately 20 seconds whereupon the skimming operation described hereinabove commences 60 seconds later and is completed in another 60 seconds. The total separation time in the solid bowl is in the order of 2 to 3 minutes.

Thereafter, three differential sequential washings are employed at the same stated r.p.m., wash water being introduced into the basket with the skimmer tube retracted and each wash being allowed to spin for two minutes, whereupon the skimmer tube is reintroduced to remove as much of the wash water as is practicable. After three such washes, much of the whey solids, excess precipitating chemicals and polysaccharides have been removed, including a substantial portion of the flatulence factors.

In handling the 860 pounds of total precipitated slurry, approximately six equal portions of the slurry are separately charged to the aforementioned solid bowl centrifuging operation. In each of the washing cycles, sufficient water was used so that approximately 600 pounds of wash water was employed overall per 100 pounds of starting bean.

From the foregoing multiple wash operations for each separation, and such six separations a total amount of 310 pounds of curd containing 41.5 pounds of solids are recovered. The curd retains its identity as such in the basket, is cohesive and has suffered minimal mechanical breakage in the separating, skimming and washing operation. The curd zone proximate the interface originally existing in the presence of the whey has only a moderate amount of broken curd and, in any event, represents a very minor weight percent of total curd solids. Most characteristically, the major depth of curd including that immediately proximate the basket wall is substantially free of any breakage, is quite cohesive and retains a desired continuous matrix-forming capability which is desired for certain applications per se. The moist curd is in a form such that it can be scooped out of the batch-type centrifuge on small laboratory proportions and can be plowed by a reverse cycle in plant scale solid bowl separations.

The 310 pounds of curd is then charged to a Koruma colloid mill for subdivision. Spinning discs of the colloid mill are separated approximately five thousandths of an inch, a distance operative to effectively subdivide the mass substantially into a uniform pumpable fluid homogeneous material fluid. In this operation the wet curd is milled after the addition of slight increments of water totalling 50 pounds of water to facilitate pumping to a spray dryer at 10-15 percent solids concentration. The slurry entering the spray dryer is contacted by inlet air at approximately 450°F. circulating at 3500 c.f.m., the curtain of subdivided droplets in a 20 foot fall being dried to a moisture content of about 2 percent. A 45 percent yield of solids (dry basis) is recovered from 100 pounds of starting beans (92 pounds dry basis).

The product thus produced has the aforementioned stability and other organoleptic and functional characteristics.

What is claimed is:

1. Process of recovering a stable nutritious soy protein product which comprises hydrating soybeans; grinding said hydrated soybeans to form a mash and autoclaving said soy bean mash under conditions and for a period of time to extract a soy milk from the soybean mash while inactivating the lipoxydase content thereof; said soy milk being extracted from said soybean mash during said autoclaving over a period of at least five minutes; separating said extracted milk from the soybean mash; salt-precipitating the milk to yield a coprecipitate of protein-oil curd and whey; centrifuging the coprecipitate and whey to develop distinct curdbed and whey phases wherein a major depth of the bed exists as a continuous cohesive matrix; centrifugally skimming the whey phase and associated water soluble components, washing the centrifugally separated curd to an extent sufficient to remove residual whey solids, excess precipitating chemicals and polysaccharides therefrom; subdividing the curd and forming a dispersion of curd particles; and spray drying said dispersion.

2. Process of claim 1 wherein the centrifugally separated curd is centrifugally washed.

3. Process of claim 2 wherein each centrifugation is conducted at in excess of 500 g's.

4. Product of the process of claim 1.

5. The process of claim 3 wherein the milk is precipitated by a calcium salt.

6. The process of claim 5 wherein the salt comprises calcium sulphate.

7. The process of claim 1 wherein the soy milk is extracted at a temperature exceeding 170°F. for at least 15 minutes.

8. The process of claim 1 wherein the curd is spray dried using an inlet air drying temperature below 500°F.

9. The process of claim 8 wherein the curd is subdivided in a colloid mill preparatory to spray drying.

* * * * *